(12) United States Patent
Bogner et al.

(10) Patent No.: US 7,152,414 B2
(45) Date of Patent: Dec. 26, 2006

(54) OPERATING UNIT COMPRISING AT LEAST ONE OPERATING ELEMENT

(75) Inventors: Alexander Bogner, Ditzingen (DE); Christoph Dahm, Kernen (DE)

(73) Assignee: DaimlerChrysler AG, Stuttgart (DE)

(*) Notice: Subject to any disclaimer, the term of this patent is extended or adjusted under 35 U.S.C. 154(b) by 396 days.

(21) Appl. No.: 10/473,400

(22) PCT Filed: Feb. 21, 2002

(86) PCT No.: PCT/EP02/01827

§ 371 (c)(1),
(2), (4) Date: Mar. 15, 2004

(87) PCT Pub. No.: WO02/078989

PCT Pub. Date: Oct. 10, 2002

(65) Prior Publication Data

US 2004/0144109 A1 Jul. 29, 2004

(30) Foreign Application Priority Data

Mar. 31, 2001 (DE) ................. 101 16 266

(51) Int. Cl.
*F25B 49/00* (2006.01)
*F25D 29/00* (2006.01)
*G05D 23/12* (2006.01)

(52) U.S. Cl. .................. 62/126; 62/161; 165/11.1; 236/1 C

(58) Field of Classification Search ........... 62/125, 62/126, 127, 129, 130, 157, 161; 236/94, 236/1 C; 165/11.1, 11.2
See application file for complete search history.

(56) References Cited

U.S. PATENT DOCUMENTS

| 4,688,389 A | * | 8/1987 | Iida .............................. 62/127 |
| 4,970,870 A | * | 11/1990 | Midlang et al. .............. 62/126 |
| 5,230,467 A | * | 7/1993 | Kubsch et al. ................ 236/94 |
| 5,983,146 A | | 11/1999 | Sarbach |

FOREIGN PATENT DOCUMENTS

| DE | 34 45 235 A1 | 6/1986 |
| DE | 196 36 210 C1 | 7/1997 |
| DE | 696 08 224 T2 | 7/1997 |
| EP | 0 781 672 B1 | 7/1997 |

OTHER PUBLICATIONS

German Office Action dated Oct. 11, 2005 (Three (3) pages).

* cited by examiner

*Primary Examiner*—Marc Norman
(74) *Attorney, Agent, or Firm*—Crowell & Moring LLP

(57) ABSTRACT

The invention relates to an operator control unit having at least one operator control for setting a setpoint value, in particular a temperature, an air quantity and/or an air distribution, an automatic function being provided for the air quantity, air distribution and temperature which is activated by actuating the operator control.

The invention provides that, by actuating the operator control for longer than an actuation time z, the setpoint values of functions which are controlled directly or indirectly by the air-conditioning unit are reset to the automatic state which is permanently set at the factory.

10 Claims, 1 Drawing Sheet

OPERATING UNIT COMPRISING AT LEAST ONE OPERATING ELEMENT

This application is a national stage of international patent application no. PCT/EP02/01827, filed Feb. 21, 2002, the entire disclosure of which is incorporated herein by reference. Priority is claimed based on German patent application no. 10116 26639, filed Mar. 31, 2001.

BACKGROUND AND SUMMARY OF THE INVENTION

The invention relates to an operator control unit having at least one operator control.

An operator control unit of the generic type having at least one operator control is known, for example, from German reference DE 199 26 652 C1 in which an operator control which has a plurality of functions is provided. The operator control is embodied as a momentary contact switch. This momentary contact switch switches, when actuated normally, between fresh air supply and recirculated mode. That is, it makes it makes manual settings in accordance with the driver's request. However, if the switch is actuated by means of a double click, this leads to the setting of the automatic mode. The automatic mode is therefore set by a double rapid actuation within a highly restricted time window.

In this type of operator control unit having at least one operator control, it is disadvantageous that only one automatic function can be called using the operator control. It is in particular not possible to set and call a plurality of automatic functions using a single operator control.

The object of the invention is to provide an operator control unit with an operator control function which combines a plurality of automatic functions, but remains user-friendly for the operator.

According to the present invention, it is advantageous that the operator can set a plurality of automatic functions using one operator control, and can also store presettings for the automatic function, which can be reset again. In this way, the operator can store a set temperature setpoint value as an automatic value by actuating just one operator control, which automatic value can be called by actuating the operator control and can also be reset to the value predefined at the factory. Furthermore, the air quantity and the air distribution can also be set automatically by calling the automatic function. An automatic function can thus be stored, called and reset again over the actuation time of the operator control.

BRIEF DESCRIPTION OF THE DRAWINGS

The invention is explained in more detail by means of an exemplary embodiment in conjunction with a description of the figures.

DETAILED DESCRIPTION OF THE PREFERRED EMBODIMENT

Figure 1:
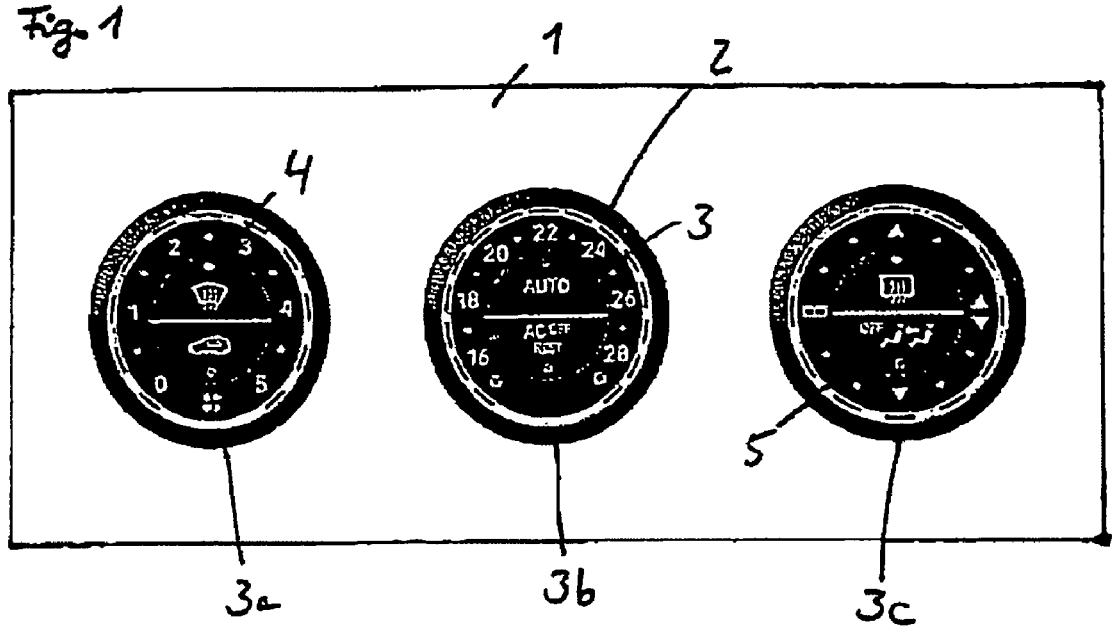
FIG. 1 shows an operator control unit having at least one operator control with all-auto function.

FIG. 1 shows an operator control unit 1 having an operator control 2 with what is referred to as an "all-auto function" 3 for an automatic air-conditioning system. The operator control unit also has two further operator controls 3a, 3c. The operator control 3a is used to set the air quantity, and thus to set the blower stage. The operator control 3c is used to set air distribution for distributing the air to the individual outlet nozzles in the passenger compartment of the vehicle. Furthermore, at this operator control 3b, it is also possible to activate the heatable rear window and it has a function for switching off the air-conditioning of the rear part of the passenger compartment. Switching off the air-conditioning at the rear part of the passenger compartment is appropriate if no-one is sitting in the rear part of the passenger compartment so that the space to the rear does not need to be air-conditioned. The power can then be sufficient for the optimum setting of the front part of the passenger compartment of the vehicle. By actuating this operator control 3, the air quantity, the air distribution and the setpoint temperature are set automatically. The operator control 3 also serves to store another temperature setpoint value desired by the driver. Thus, many vehicle occupants desire a somewhat warmer passenger compartment temperature. By setting the desired temperature setpoint value on the operator control 2, the vehicle occupants can store the desired value by actuating the automatic pushbutton key 3 for a predefined actuation time of, for example, longer than x=10 seconds and call it by actuating said key again for less than y=3 seconds. The temperature setpoint value is reset to a value which is preset at the factory or predefined by actuating the operator control 3 over an actuation time of longer than z=3 seconds. At the same time, further functions, for example a defrost function which was activated on the operator control 4, can also be deactivated or the air-conditioning in the rear part of the passenger compartment which was deactivated on the operator control 5 is activated again. Both the defrost function and the rear-off function can be activated by, in each case, an operator control 4 and 5 in the operator control unit 1. It is also possible to deactivate the 4-zone air-conditioning by means of an operator control. These functions which can usually be actuated individually by one operator control each can be switched off when resetting occurs. All the functions which can be activated by means of a separate operator control can be reset here. The heatable rear window can also be activated in this way on the operator control 3c. This function can also be reset with the "all-auto function", that is to say the heatable rear window can also be switched off. This is carried out by actuating the operator control 3 for an actuation time of longer than 3 seconds.

Figure 2:
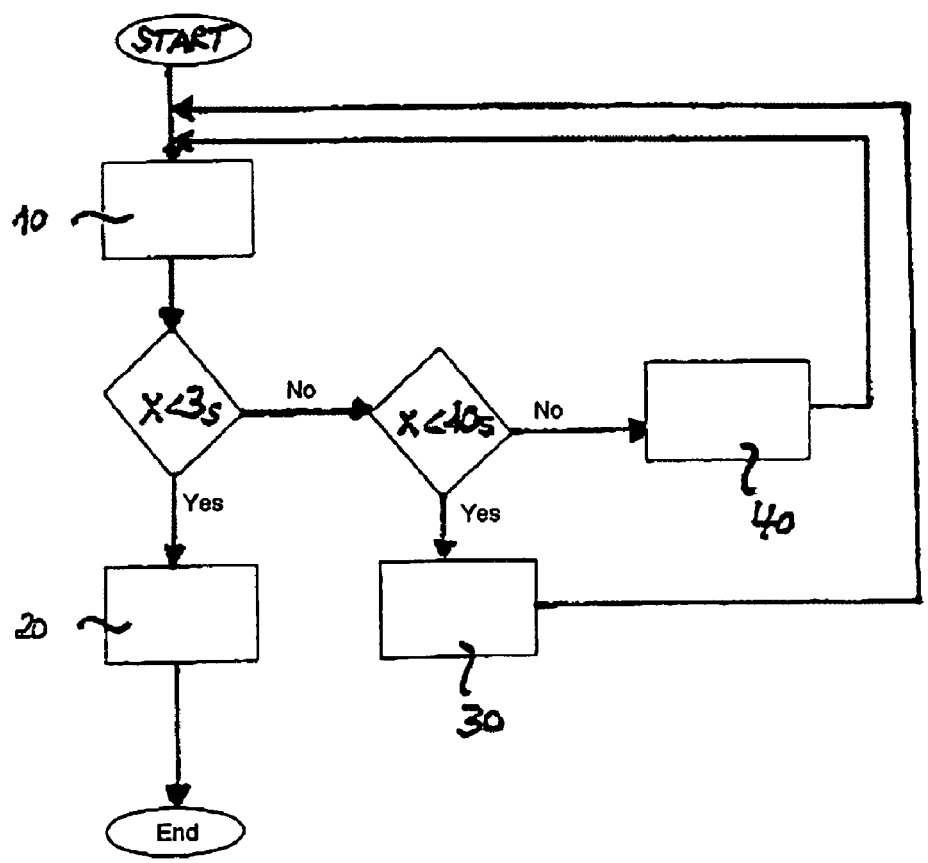
FIG. 2 shows a method sequence of the all-auto function.

FIG. 2 shows a method sequence for the all-auto function. The all-auto function can be actuated by means of an operator control 3 as shown in FIG. 1. At 10, an interrogation relating to the actuation time takes place. If the actuation time x<3 s, the automatic function is activated at 20. In the case of an actuation time x>3 s, a further interrogation takes place to determine whether the actuation time x<10 s, consequently with a different threshold value. When an actuation time is less than 10 seconds, x<10 s, the temperature setpoint value which was set by the operator is overwritten at 30 so that it is then the temperature setpoint value as set at the factory. When the actuating time is 10 seconds or greater, the temperature set point valve is set by the operator and stored at 40. This value is then called at 20 if the operator control 3 is again actuated for a time period of less than 3 seconds. In addition, the setpoint values for the air quantity and the air distribution are then also called and set by the air-conditioning controller. All the values are reset at 30 by actuating the operator control 3 for an actuation time of over 3 seconds and less than 10 seconds. The storage, the overwriting and the interrogation consequently take place over the actuation time of the operator control. The operator control is, for example, a momentary contact switch; the time for which the operator control is held pressed in is therefore the actuation time.

The invention claimed is:

1. An operator control unit, comprising:
   at least one operator control device for setting at least one setpoint value,
   an automatic function unit, which is activated by actuating one of the at least one operator control device, wherein by actuating said one operator control device for longer than an actuation time z, the at least one setpoint value is reset to a predefined value, wherein the at least one of the setpoint value which is set at least another one of said at least one operator control device is stored by actuating said one operator control device for longer than an actuation time x.

2. The operator control according to claim 1, wherein the stored setpoint value is called, and the automatic function is activated, by actuating said one operator control device for less than an actuation time y.

3. The operator control unit according to claim 2, wherein the actuation time x is 10 seconds, the actuation time y is 3 seconds and the actuation time z is 3 seconds.

4. The operator control unit according to claim 1, wherein any function which can be activated by means of said at least one operator control device is deactivated by means of the automatic function unit.

5. The operator control unit according to claim 1, wherein a defrost function, a rear-off function for deactivating an air-conditioning in a rear part of a passenger compartment of a vehicle or a function for deactivating 4-zone air-conditioning can be deactivated by the automatic function unit.

6. An operator control unit having at least one operator control device for setting at least one setpoint value of at least one of a temperature, an air quantity and an air distribution, said operator control unit including an automatic function unit, which is activated by actuating said at least one operator control device, said automatic function unit being provided for said at least one of the air quantity, air distribution and temperature, wherein by actuating one of the at least one operator control for longer than an actuation time z, the at least one setpoint value is reset to an automatic state which was permanently set at a factory, wherein at least one of the setpoint values which is set at the operator controls is stored by actuating said one operator control for longer than an actuation time x.

7. The operator control according to claim 6, wherein the stored setpoint value is called, and the automatic function is activated, by actuating the operator control for less than an actuation time y.

8. The operator control unit according to claim 6, wherein the actuation time x is 10 seconds, the actuation time y is 3 seconds and the actuation time z is 3 seconds.

9. The operator control unit according to claim 6, wherein any function which can be activated by means of an operator control is deactivated by means of the automatic function.

10. The operator control unit according to claim 6, wherein a defrost function, a rear-off function for deactivating an air-conditioning in a rear part of a passenger compartment or the function for deactivating a 4-zone air-conditioning can be deactivated by the automatic function unit.

* * * * *